Figure 12:
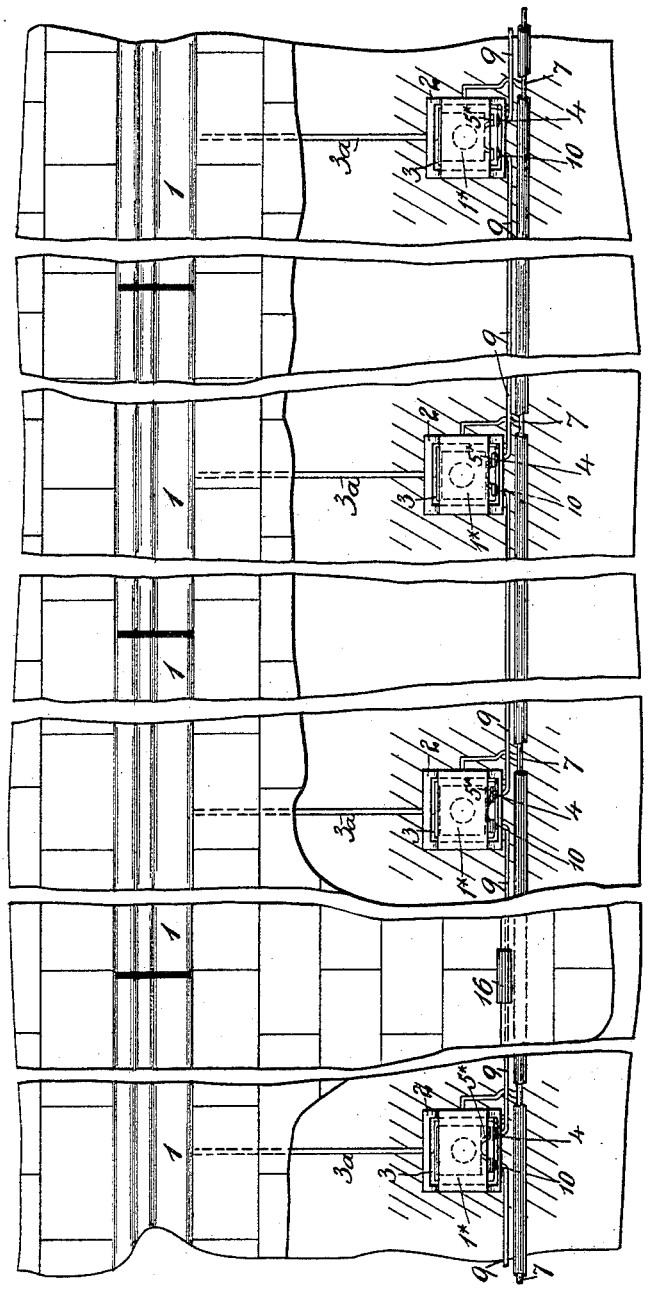

(No Model.) 6 Sheets—Sheet 1.
F. WYNNE.
APPARATUS FOR PROPELLING VEHICLES BY ELECTRICITY.
No. 419,094. Patented Jan. 7, 1890.
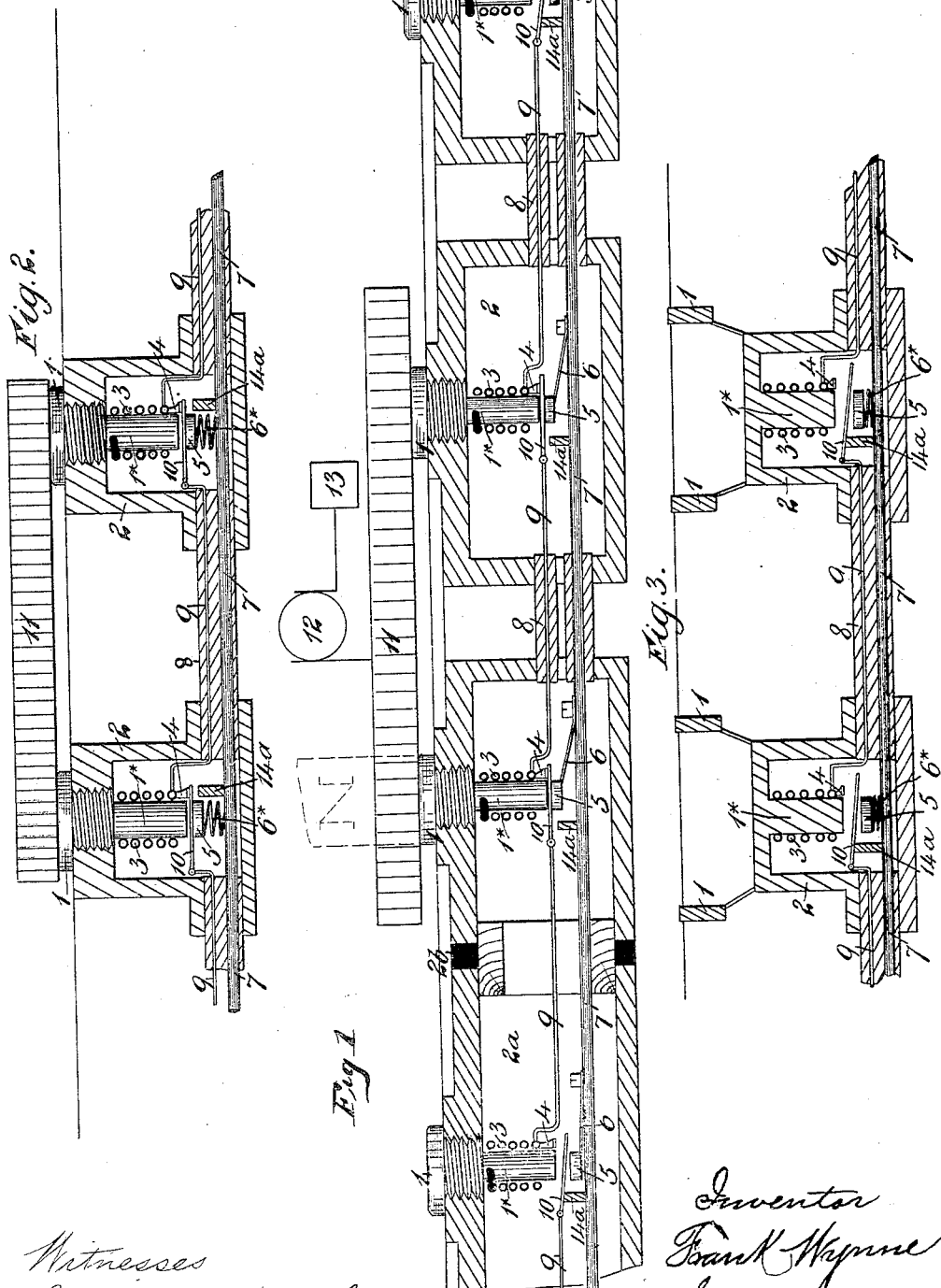
Witnesses
Jos H Blackwood
H J McGinness
Inventor
Frank Wynne
by Wm H Doolittle
Atty
N. PETERS. Photo-Lithographer. Washington, D. C.

(No Model.) 6 Sheets—Sheet 2.
F. WYNNE.
APPARATUS FOR PROPELLING VEHICLES BY ELECTRICITY.
No. 419,094. Patented Jan. 7, 1890.
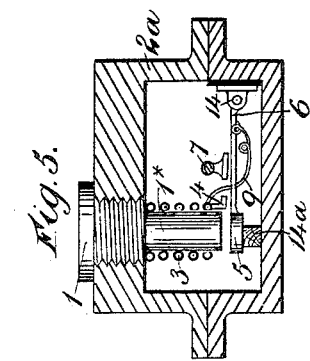
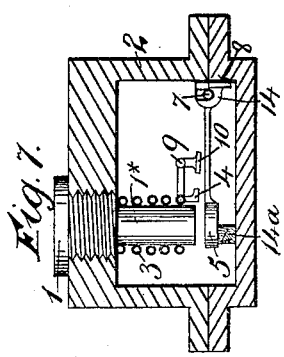
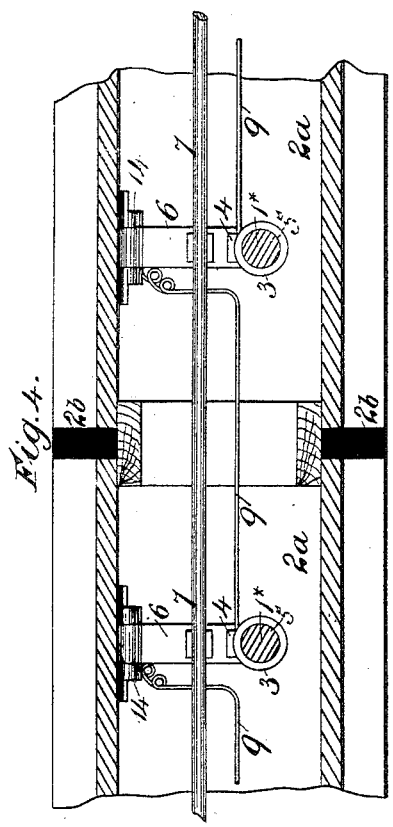
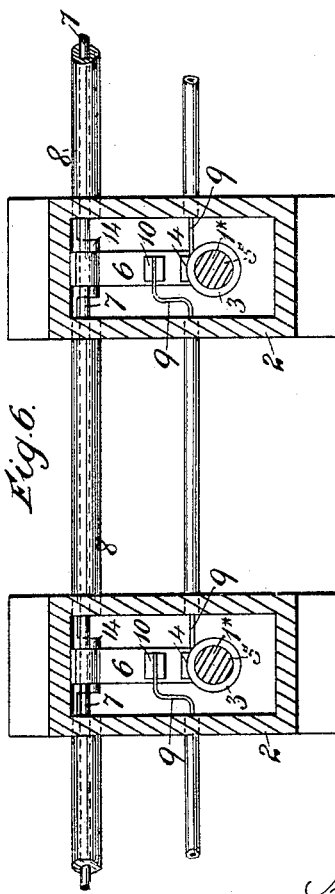
Witnesses
Jos H Blackwood
Inventor
Frank Wynne
by Wm H Doolittle
Attorney (No Model.) 6 Sheets—Sheet 3.
F. WYNNE.
APPARATUS FOR PROPELLING VEHICLES BY ELECTRICITY.
No. 419,094. Patented Jan. 7, 1890.
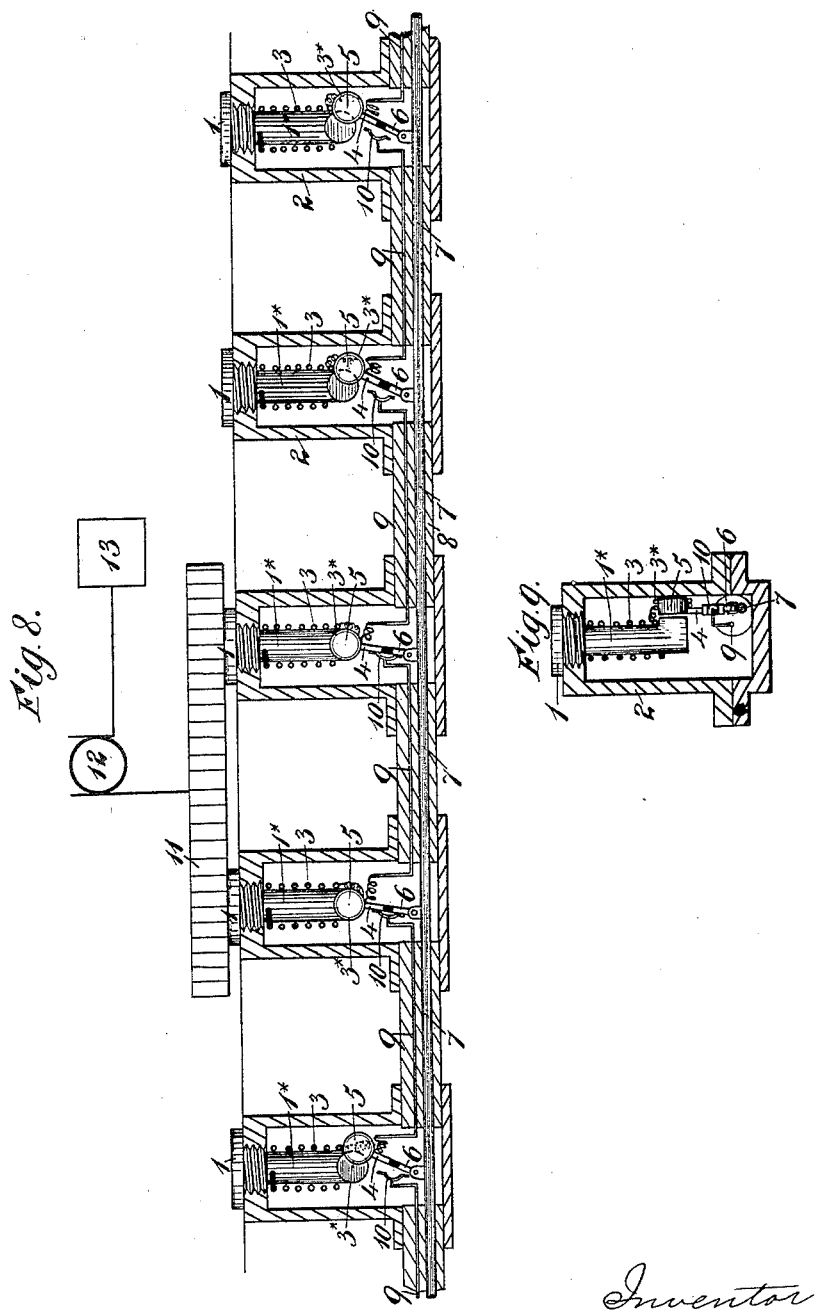

(No Model.) 6 Sheets—Sheet 4.
F. WYNNE.
APPARATUS FOR PROPELLING VEHICLES BY ELECTRICITY.
No. 419,094. Patented Jan. 7, 1890.
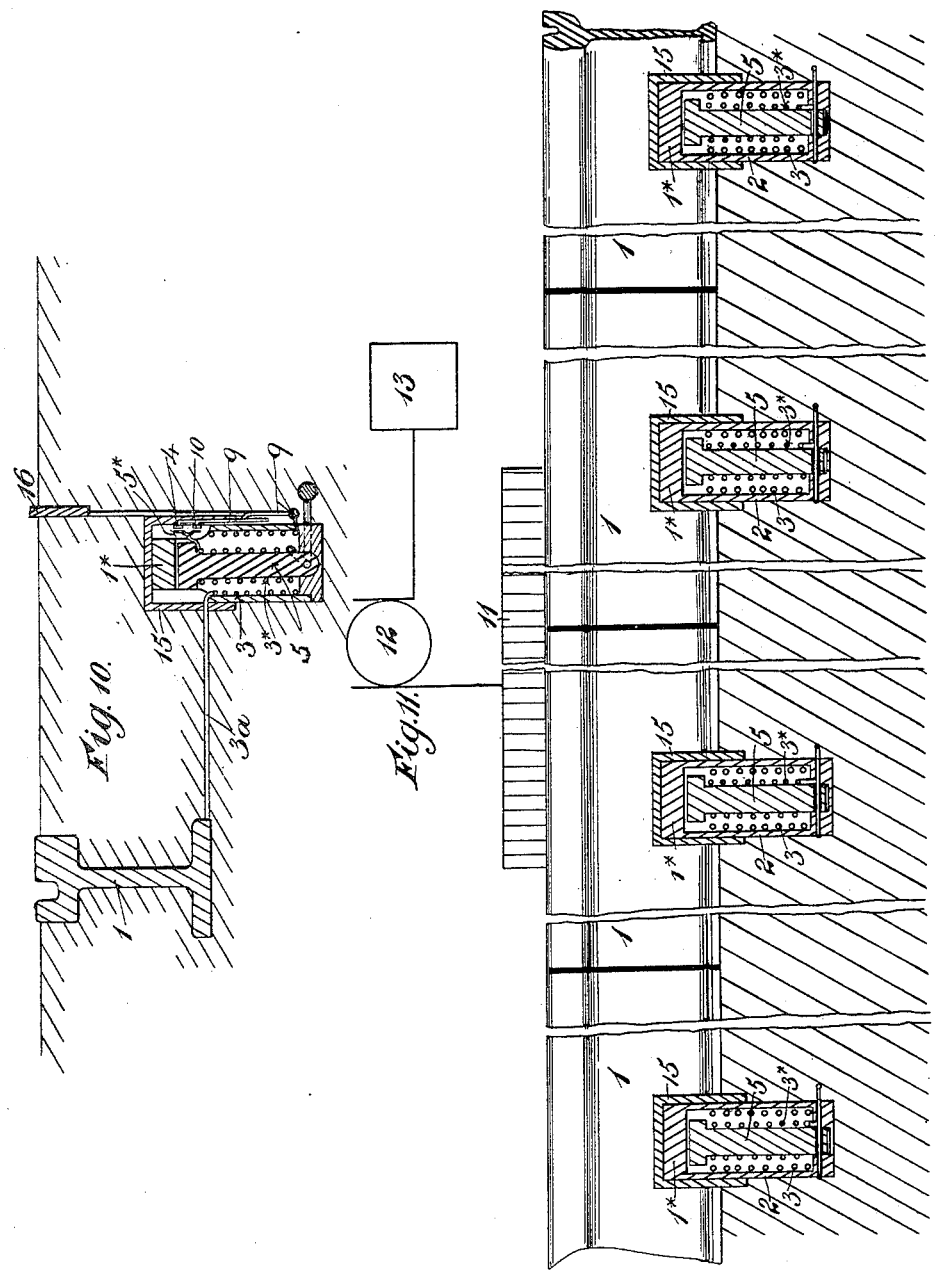
Witnesses
Jos H Blackwood
H J McGinness
Inventor
Frank Wynne
by Wm A Doolittle
Atty (No Model.) 6 Sheets—Sheet 5.
F. WYNNE.
APPARATUS FOR PROPELLING VEHICLES BY ELECTRICITY.
No. 419,094. Patented Jan. 7, 1890.

Witnesses
Jos. H. Blackwood

Inventor
Frank Wynne
by Wm. P. Doolittle
Atty (No Model.) 6 Sheets—Sheet 6.
F. WYNNE.
APPARATUS FOR PROPELLING VEHICLES BY ELECTRICITY.
No. 419,094. Patented Jan. 7, 1890.
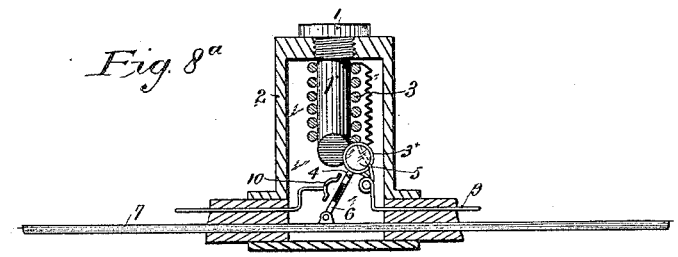
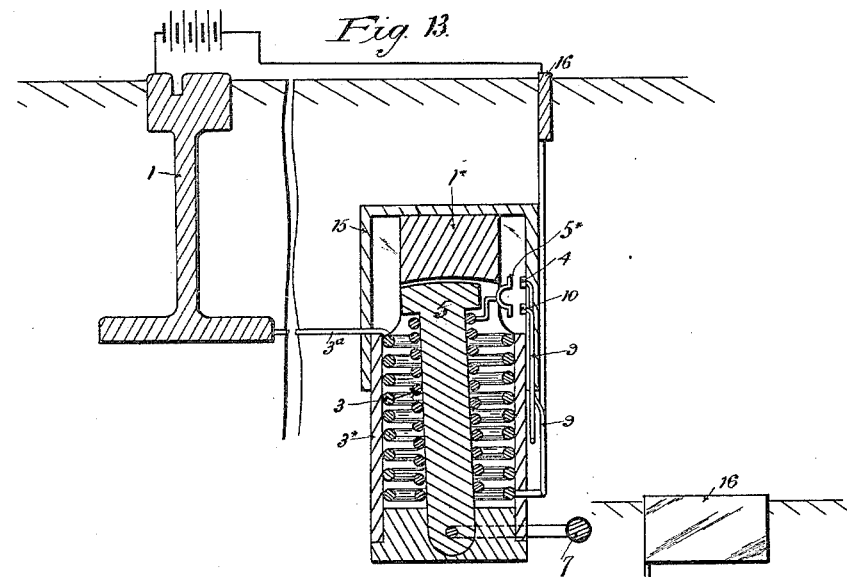
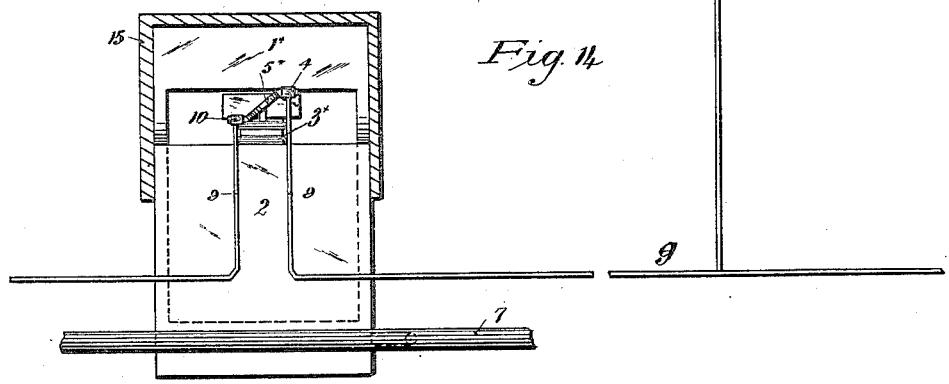
Witnesses
Jos H Blackwood
F. P. Davis
Inventor:
Frank Wynne
by W. H. Doolittle
Atty

UNITED STATES PATENT OFFICE.

FRANK WYNNE, OF WESTMINSTER, ENGLAND.

APPARATUS FOR PROPELLING VEHICLES BY ELECTRICITY.

SPECIFICATION forming part of Letters Patent No. 419,094, dated January 7, 1890.

Application filed December 1, 1887. Serial No. 256,710. (No model.) Patented in England January 17, 1887, No. 747.

*To all whom it may concern:*

Be it known that I, FRANK WYNNE, a subject of the Queen of Great Britain and Ireland, residing at Carteret Street, in the city of Westminster, Kingdom of Great Britain and Ireland, have invented new and useful Apparatus for Propelling Vehicles by Electricity, of which the following is a specification.

The subject of this application also forms part of British patent to me, dated January 17, 1887, No. 747.

My present invention relates to apparatus for propelling vehicles on roads (provided or not with rails for the vehicle to travel upon) by means of electricity that actuates a motor or motors carried by the vehicle propelled, and which is or are introduced into a circuit that is progressively closed as the vehicle proceeds.

According to this invention the circuit is progressively closed by contact-makers, which electrically connect a main conductor of electricity seriatim with a series of road bars, plates, or studs, hereinafter termed "road-contacts," parts of which are exposed in the roadway and which are electrically connected with a series of contacts in a channel, or each in a separate box in the roadway, as hereinafter described. Each contact-maker comprises a suitable armature or keeper, which is attracted or moved by the magnetic influence of a core or mass of magnetic material when the same is, as is hereinafter described, given magnetic polarity, and which by means of suitable attachments or connections, when thus moved, makes and keeps electrical connection between the main conductor and a road-contact so long as the magnetic polarity of the core or mass continues.

Referring to the accompanying sheets of drawings, Figure 1 is a longitudinal vertical section illustrating one arrangement of apparatus for carrying out this invention. Figs. 2 to 14 are sectional views illustrating modified arrangements of the apparatus, and are hereinafter described.

Referring to Fig. 1, 1 1 are road-contacts carried, it may be, by a series of closed boxes 2, as shown to the right-hand side of the figure, or by a closed channel $2^a$, constructed in parts each of which carries a contact, and is insulated at $2^b$ from the adjacent parts, as shown at the left-hand side. Each road-contact is exposed in the road upon which the vehicles are to be electrically propelled and is formed in one with a core $1^*$, which projects into the box or channel that carries the road-contact, as shown.

3 3 are insulated solenoids or coils, each wound upon a core $1^*$ and forming therewith an electro-magnet when the circuit of the solenoid is completed, as hereinafter described. The upper end of each solenoid is connected to the core $1^*$, upon which it is wound, while its lower end is exposed in the channel or box so as to form a contact 4, for a purpose hereinafter explained.

5 5 are armatures of iron, each arranged below a core $1^*$ and carried by a metal spring-arm 6, which is electrically connected to a main conductor 7 of electricity. The conductor 7 in the example shown traverses the boxes or the channels 2 or $2^a$, as the case may be, and is insulated at the parts 8. Each armature 5, with its spring-arm 6, constitutes a contact-maker, which normally assumes a position such as to break connection between the contact 4 of the solenoid above it and the main conductor. Each solenoid 3 is connected by a conductor 9 to a pivoted tongue 10, which is arranged between the core $1^*$ in connection with the next adjacent rear road-contact 1 and the armature 5 of the contact-maker thereof in such a manner as to be normally out of contact with both. Each tongue 10 is so arranged that when the armature 5 below it is attracted by the polarization of the core $1^*$ above it will be pressed against the contact 4 of the solenoid surrounding the said core, which, as well as the attached road-contact, will then be electrically connected with the main conductor 7 through each solenoid.

11 is a contact or brush carried by the car or vehicle to be propelled. It is connected to one pole of the car-motor and is arranged to travel against the exposed upper ends of the road-contacts.

12 represents diagrammatically the car-motor, and 13 an earth-return in electrical connection with the other pole of said motor.

The action of the apparatus is as follows: Suppose the vehicle to be propelled to be in place, with its contact 11 resting on one or more of the upper ends of the road-contacts exposed in the roadway. Then, if one of these contacts and its attached core be polarized, the armature of the contact-maker below it will be attracted. This attraction of the armature causes the tongue 10, situate between it and the polarized core 1*, to be forced into metallic contact with the armature and the contact 4 of the corresponding solenoid 3, the road-contact in connection with the solenoid, and the car-motor circuit will be thus placed in electrical connection with the main conductor 7, and enable the vehicle to be started. The electric current, when flowing through the solenoid by way of the exposed contact 4, serves to maintain the polarization of the core 1*, which will hold up the armature 5 and keep the electrical circuit closed until the car-contact 11 leaves the road-contact in connection with the said core 1*. The tongue 10 also places the next forward solenoid, with which it is electrically connected, and the corresponding core 1* and road-contact in electrical connection with the main conductor 7, and charge such parts with electricity. When as the vehicle travels the car-contact 11 reaches this new-charged forward road-contact, the circuit of the solenoid surrounding the core 1*, connected with said road-contact, will be completed through the said car-contact 11 and car-motor to earth. This new core 1* will thus become polarized, and will operate its contact-maker and the tongue 10 below it, as before, and will also place the next forward road-contact and solenoid in connection with the main conductor. Thus as the vehicle moves forward its motor-circuit is progressively completed by the contact-makers acting in consecutive order. After the passage of the car-contact 11 the contact-makers cease to act in consecutive order. The initial excitation or polarization of one or more of the cores carried by the road-contacts to complete the car-motor circuit at starting can (when required) conveniently be effected by a magnet that may be carried by the vehicle to be propelled.

In Fig. 2, which is a longitudinal section, the means for successively completing the car-motor circuit are similar to those shown in Fig. 1, except that the armatures 5 of the contact-makers are carried by spiral springs 6*, which normally hold the said armatures away from the cores 1*. In this arrangement the main conductor 7 and the conductors 9 are inclosed in the same cable 8, as shown.

In Fig. 3, which is a longitudinal section, the road-contacts 1 are in the form of plates arranged transversely to the length of the road on which the vehicle travels. These contacts are electrically connected in pairs (or other numbers) with a box 2, which is formed with a projecting part 1*, that serves as a core, which is polarized at the desired times by a solenoid 3, in the manner hereinbefore described, or the road-contacts may be electrically connected to such solenoid.

In Figs. 4 and 5, which are respectively a sectional plan and a transverse section, the main conductor 7 is shown arranged at one side of the cores 1*. Each iron armature 5 is pivoted at 14, and is normally out of contact with the main conductor 7 and the contact 4 of the solenoid above it, but is permanently connected with the solenoid 3 of an adjacent positive contact by a conductor 9. As each armature is attracted by the polarization of the core 1* above it, it places the solenoid and the road-contact in connection with said core and the next forward solenoid and road-contact in connection with it in electrical connection, as before, with the main conductor, against which it then bears.

Figs. 6 and 7 are similar views to Figs. 4 and 5, but showing the armatures 5 arranged in separate boxes and pivoted to the cable 7, to which they are electrically connected. The conductors 9 in this arrangement have their end portions 10 so arranged as to make contact with the corresponding armature when such armature is attracted. 14ª 14ª are stops or abutments in each of the arrangements where shown. They may be used for holding the armatures 5 or the tongues 10, or both, (as the case may be,) in their normal positions.

In Figs. 8 and 9, which are, respectively, a longitudinal and a transverse section, each armature 5, which is carried by a pivoted arm 6, electrically connected with the main conductor, is wound around its periphery with a coil 3*, forming part of the conductor 9, and connected with the solenoid 3 in series. The solenoid 3 and coil 3* may, however, be arranged in parallel with each other, as indicated in transverse section in Fig. 8ª. When a current of electricity passes through coil 3*, it polarizes the armature 5, which will then be more strongly attracted by the adjacent polarized core or mass 1* than if the armature be not independently polarized. Flexible conducting wires or strips serve to connect the coil 3* with the adjacent solenoid 3 and conductor 9 so as to permit of movement of the armature carrying said coil. Each coil 3* is provided with an exposed part or contact 4. 10 10 are contact-strips, each of which is carried by the free end of one of the conductors 9, and is adapted to bear against a pivoted arm 6 and a part or contact 4 and place them in electrical connection when the contact-maker 5 6 is operated or closed. The arrangement is such that when any one conductor 9 and connected coil 3* and solenoid 3 are electrically connected to the main conductor by a contact-maker to the rear and the circuit of such coil 3* and solenoid is completed through the connected road-contact 1 by the car-contact 11 and car-motor circuit to earth, the corresponding armature 5 will be polarized and attracted by the corresponding polarized core 1* connected to said road-contact, and will cause the contact 4 and arm 6 to be forced into contact with the contact-strip 10, carried by the next forward conductor 9. The road-contact will thus be placed in electrical connection with the main conductor 7 by way of the solenoid 3, coil 3*, contact 4, contact-strip 10, and pivoted arm 6, and the contact-maker will be thereby held up or closed to maintain such connection so long as the car-contact 11 remains in contact with the said road-contact, and the car-motor circuit is completed. The closing of the contact-maker also places the said forward conductor 9 and the connected forward coil 3*, solenoid 3, and road-contact 1 in electrical connection with the main conductor, thus preparing the forward contact-maker, so that when the car-carrier 11 reaches this new forward road-contact the circuit of the said coil and solenoid will be completed, their contact-maker will be closed, and the hereinabove-described operations and connections are repeated, to progressively complete the car-motor circuit.

In Figs. 10, 11, and 12, which are respectively a transverse section, a longitudinal section, partly in elevation, and a part plan or top view, and in Figs. 13 and 14, which are similar views to Figs. 10 and 11, but drawn to a larger scale, each road-contact 1 is in the form of a short length of insulated rail, upon which the wheels at one side of the vehicle to be propelled may travel. Each of these road-contacts 1 is connected to a solenoid 3 by a conductor 3ᵃ. Each of the solenoids 3 is wound within a box 2, which is formed with a bridge piece or mass 1*, which becomes polarized and attracts the armature 5 below it when the circuit of said solenoid is completed. Each armature 5 is pivoted at the bottom of its box 2, and normally assumes a position out of the perpendicular, as shown more clearly in Figs. 10 and 13. It is wound with a coil 3*, which carries at one end a contact-strip 5*, and is connected at its other end to the main conductor 7. 4 4 are contacts, each exposed in a box 2, and arranged in electric connection with a conductor 9 and the solenoid 3, connected thereto. 10 10 are other contacts, each of which is located within a box 2 and connected to the normally disconnected end of the conductor 9 leading to the next forward solenoid and road-contact. Each contact-strip 5* is normally out of contact with the adjacent contacts 4 and 10, as shown in Figs. 10 and 13. When the circuit of one of the solenoids 3 is completed by the car-contact 11 coming into connection with the road-contact 1 connected to said solenoid when the car-motor circuit is completed, the armature 5 will be attracted by the polarized mass 1* and the contact-strip 5* will place the said solenoid and road-contact in electrical connection with the main conductor through the contact 4 and winding or coil 3*. The contact-strip 5* also places the next forward solenoid and road-contact in electrical connection with said main conductor by way of the conductor 9 and contact 10, as before. The current when flowing through the coil 3* polarizes the armature and re-enforces the attraction between such armature and the polarized mass 1*, thus insuring good connection between the contact-strip 5* and the contacts 4 and 10. Each box 2 is provided with a cover 15, preferably of non-magnetic material.

In each of the arrangements hereinbefore described and shown it will be seen that the solenoids 3 are energized by currents in series-circuit with the car-motor, and that they are never put to earth unless an earth-return be employed, and then only through the car-motor circuit.

In each arrangement herein shown and described, when the car-motor circuit is broken the circuits of the solenoids in connection with the road-contacts upon which the car-carrier for the time being rests will be broken and the corresponding cores or masses 1* will cease to be polarized, and the corresponding armatures will cease to make electrical connection between such road-contact and the main conductor. In order, therefore, to enable the circuit of one or more of the said solenoids to be again completed, additional road-contacts 16 16 (see Figs 10 and 12) are provided, each of which is connected with a conductor 9, as shown.

By placing one pole of a suitable battery carried, it may be, by the car in communication with one of such road-contacts 16 and with the next forward road-contact 1, as indicated in Fig. 13, the circuit of the solenoid in connection with the said road-contact 1 will be completed, the corresponding core or mass 1* will be polarized, and the armature of the corresponding contact-maker will be closed and again connect the said road-contact with the main conductor, so that the car-motor circuit can be again completed and the vehicle propelled.

The positive contacts, when separately carried by independent boxes, as shown at the left-hand side of Fig. 1, and in Figs. 2, 6, 7, 8, and 9, will, under ordinary circumstances, be sufficiently insulated without insulating them from the boxes; but if they are carried by a metallic channel common to a number of them, in the manner shown at the right-hand side of Fig 1 and in Figs. 4 and 5, then they must be separately insulated from such channel, or the part of the channel that carries each contact must be insulated from adjacent parts, as shown.

I may in some cases dispense with the before-mentioned solenoids 3, and induce the magnetic polarity in the positive contacts by means of an electro-magnet carried on the vehicle, as shown in dotted lines in Fig. 1, a pole of such electro-magnet being successively placed near to or in contact with the exposed upper ends of the positive contacts, which in this case are preferably made of soft iron. In such an arrangement I consider it desirable that the box or channel containing the contact-maker should not be of a strongly-magnetic material.

What I claim is—

1. In apparatus for propelling vehicles by electricity, the combination of an insulated main conductor of electricity, a series of insulated contacts distributed along and having parts exposed in the road or track over which vehicles are to be electrically propelled, and adapted to be temporarily connected in consecutive order with said main conductor on the passage of the car-motor, cores or masses of magnetic material, solenoids or coils for polarizing said cores or masses, each of said solenoids or coils being in electrical connection at one end with a road-contact and at its other end adapted to be temporarily placed in electrical connection with said main conductor by a contact-maker located in the rear of the road-contact, said contact-maker being adapted to be operated by said cores or masses of magnetic material when the same are polarized, and to electrically connect said road-contacts in consecutive order with said main conductor, a car-motor, and a car-contact in electrical connection with said car-motor and adapted to make contact with two or more of said road-contacts, for the purpose set forth.

2. In apparatus for propelling vehicles by electricity, the combination of an insulated main conductor, a series of road-contacts distributed apart along the road or track and normally disconnected from said main conductor, a series of auxiliary conductors, each connected to a road-contact and arranged to be temporarily connected by a contact-maker located in the rear of the road-contact to which it is connected, and a series of contact-making devices for temporarily connecting said road-contacts through said conductors with said main conductors, and each adapted, when operated, to place the adjacent end of the conductor attached to a road-contact in advance of the one to which it corresponds in connection with said main conductor.

3. In apparatus for propelling vehicles by electricity, the combination of an insulated main conductor, a series of road-contacts distributed apart along the road or track and normally disconnected from said main conductor, a series of auxiliary conductors, each connected to a road-contact and arranged to be temporarily connected with said main conductor at two points, and a series of contact-making devices, each adapted, when operated, to connect the auxiliary conductor connected to its corresponding road-contact, and also that connected with a road-contact in advance of it, with the main conductor.

4. In apparatus for propelling vehicles by electricity, the combination of an insulated main conductor, a series of road-contacts distributed apart along the road or track and normally disconnected from said main conductor, a series of contact-making devices for temporarily connecting said road-contacts in consecutive order with said main conductor, a car-motor, car-contacts, and solenoids, each connected with a road-contact, and so arranged that when connected with said conductor by its corresponding contact-maker it is in series with said car-motor.

5. In apparatus for propelling vehicles by electricity, the combination of an insulated main conductor, a series of road-contacts distributed apart along the road or track and normally disconnected from said main conductor, a car-motor, car-contacts, cores or masses of magnetic material, solenoids arranged to polarize said cores or masses, a series of contact-makers, each of said solenoids being connected with a road-contact and with a conductor that is arranged to be connected with the main conductor at two points, one behind the other, by two consecutively-arranged contact-makers acting in succession.

6. In apparatus for propelling vehicles by electricity, the combination of an insulated main conductor, a series of road-contacts distributed apart along the road or track and normally disconnected from said main conductor, a car-motor, car-contact, cores or masses of magnetic material, solenoids for polarizing said cores or masses, and a series of contact-makers, each of such solenoids having one end in communication with a road-contact and its other end adapted to be connected with the main conductor at two points—first, by a contact-maker located to the rear of said solenoid, and, secondly, by the contact-maker that is operated by the core or mass that it polarizes.

7. In apparatus for propelling vehicles by electricity, the combination of an insulated main conductor, a series of road-contacts distributed apart along the road or track and normally disconnected from said main conductor and adapted to temporary connection therewith only while the vehicle and car-motor are passing, cores or masses of magnetic material, solenoids surrounding said cores or masses, and each connected at one end with a road-contact and at the other end with a conductor that extends into proximity with a contact-making device located in the rear of the road-contact to which it is connected, and is adapted to be connected with the main conductor at two points, one in advance of the other, and contact-making devices, each adapted when operated by a polarized core or mass to place the solenoid of the core or mass that operated it and the road-contact in connection therewith, as well as the next succeeding auxiliary conductor and road-contact in electrical connection with said main conductor, for the purposes set forth.

8. In apparatus for propelling vehicles by electricity, the combination of an insulated main conductor, a series of road-contacts distributed apart along the road or track and normally disconnected from said main conductor, and a series of contact-making devices for temporarily connecting said road-contacts in consecutive order with said main conductor, and each comprising a core or mass, a solenoid for polarizing the same, an armature and a solenoid for independently polarizing the same, as herein described, for the purpose specified.

9. In apparatus for propelling vehicles by electricity, the combination of an insulated main conductor of electricity, a series of road-contacts in the form of insulated lengths of rail (on which the wheels at one side of the vehicle to be electrically propelled may travel) and each adapted to be temporarily connected in consecutive order with said main conductor when the car-motor is passing, a car-motor, a car-contact connected to said motor, and a series of contact-making devices each adapted, when operated, to connect its own and the next succeeding road-contact with said main conductor.

10. In apparatus for propelling vehicles by electricity, the combination of an insulated main conductor of electricity, a series of insulated road-contacts distributed along the road or track over which vehicles are to be electrically propelled and adapted to be temporarily connected with said main conductor when the car-motor is passing, cores or masses of magnetic material, solenoids or coils for polarizing said cores or masses, one end of each of said solenoids or coils being connected with one of said road-contacts, and its other end being normally disconnected from said main conductor, but adapted to be temporarily connected therewith, contact-making devices adapted to be operated by said cores or masses when the same are polarized, and to electrically connect said road-contacts in consecutive order with said main conductor, and a series of independent road-contacts each in electrical connection with that end of a solenoid or coil that is normally disconnected from said main conductor, for the purpose set forth.

11. For propelling vehicles by electricity, the combination of a conductor of electricity 7, boxes 2 or the equivalent thereof, road-contacts 1, cores or masses 1* of magnetic material, solenoids or coils 3, each surrounding one of said cores or masses 1* and electrically connected to one of said road-contacts 1, exposed contacts 4, each in electrical connection with one of said solenoids or coils, conductors 9, each electrically connected at one end with one of said solenoids or coils, and armatures 5, each adapted to be operated by one of said cores or masses 1* when the same is polarized, and to electrically connect one of said conductors 9 and one of said contacts 4 with said main conductor, substantially as herein described, for the purposes set forth.

12. For propelling vehicles by electricity, the combination of a conductor of electricity 7, boxes 2 or the equivalent thereof, road-contacts 1, road-contacts 16, cores or masses 1* of magnetic material, solenoids or coils 3, each surrounding one of said cores or masses 1* and electrically connected to one of said road-contacts 1 and to one of said road-contacts 16, contacts 4, each in electrical connection with one of said solenoids or coils, conductors 9, each electrically connected with one of said solenoids or coils, and armatures 5, each adapted to be operated by one of said cores or masses 1* when the same is polarized, and to electrically connect one of said conductors 9 and one of said contacts 4 with the conductor 7, substantially as herein described, for the purpose specified.

13. In apparatus for propelling vehicles by electricity, the combination of an insulated main conductor, a series of road-contacts distributed apart along the road or track and normally disconnected from said main conductor and adapted to temporary connection therewith only while the vehicle and car-motor are passing, cores or masses of magnetic material in connection with said road-contacts, solenoids, each connected at one end to a road-contact, arranged to polarize the core or mass connected thereto, and arranged at its other end to be placed in direct connection with said main conductor, and contact-making devices, each dependent for operation on the polarization of the core or mass adjacent thereto, and adapted, when operated, to directly connect the solenoid of such core or mass with the main conductor, for the purpose set forth.

In testimony whereof I have signed my name to this specification in the presence of two subscribing witnesses.

FRANK WYNNE.

Witnesses:
W. CROSS,
M. HARRINGTON,
Both of 46 *Lincoln's Inn Fields, London, England.*